(No Model.)   3 Sheets—Sheet 1.

J. BRADLEY.
STRAP, TRACE, AND LACE TRIMMER AND CUTTER.

No. 399,965.   Patented Mar. 19, 1889.

Witnesses.
R. A. Balderson
Wm Gelston

Inventor.
James Bradley
By C. P. Calvert
His Attorney.

(No Model.) 3 Sheets—Sheet 2.
J. BRADLEY.
STRAP, TRACE, AND LACE TRIMMER AND CUTTER.
No. 399,965. Patented Mar. 19, 1889.
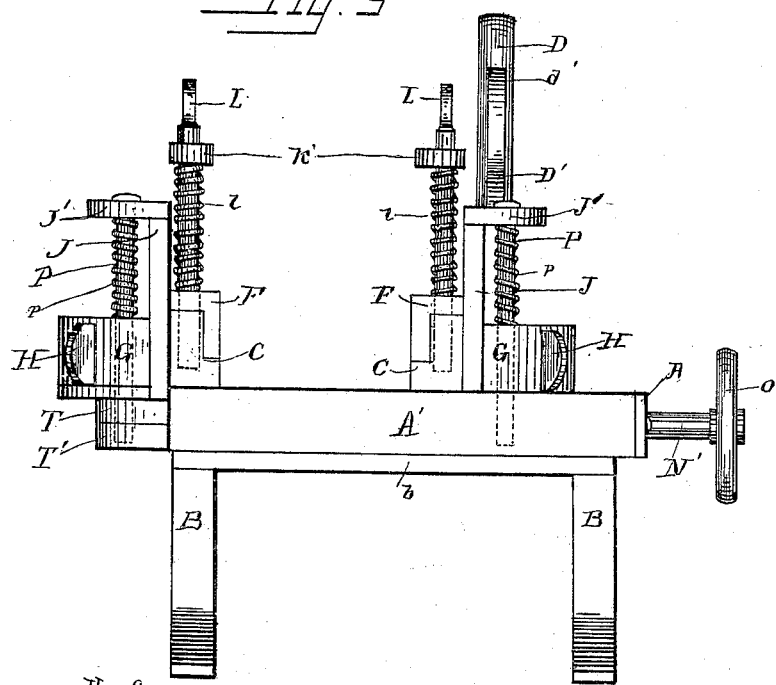
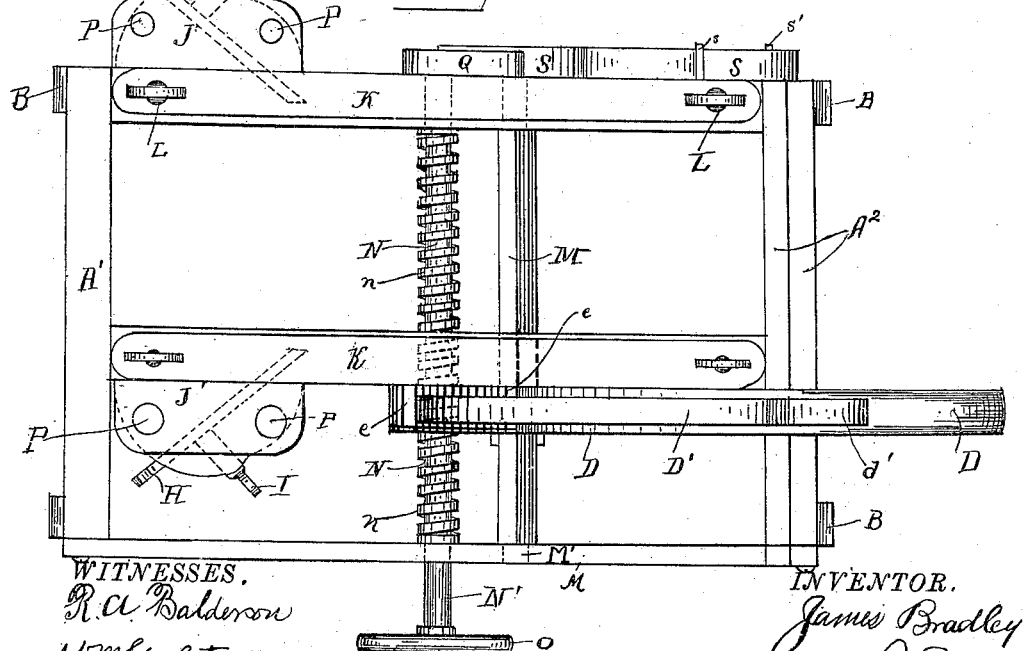
WITNESSES.
R. A. Balderson
Wm Gelston
INVENTOR.
James Bradley
C. P. Calvert.
Attorney.

(No Model.) 3 Sheets—Sheet 3.
J. BRADLEY.
STRAP, TRACE, AND LACE TRIMMER AND CUTTER.
No. 399,965. Patented Mar. 19, 1889.
Fig. 5.
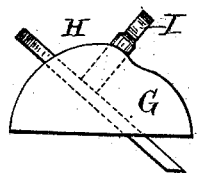
Fig. 6.
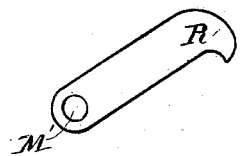
Fig. 7.
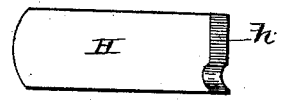
Fig. 8.
Fig. 9.
Fig. 10.
Fig. 11.
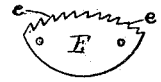
Fig. 12.
Fig. 13.
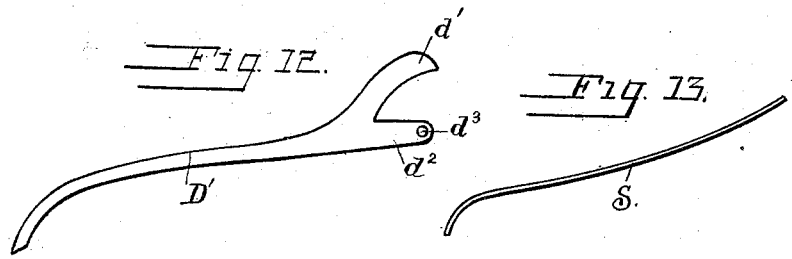
Fig. 14.
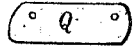
WITNESSES,
R. A. Balderson
Wm Gelston.
INVENTOR,
James Bradley
C. P. Calvert,
Attorney.

UNITED STATES PATENT OFFICE.

JAMES BRADLEY, OF DUNDEE, NEW YORK.

STRAP, TRACE, AND LACE TRIMMER AND CUTTER.

SPECIFICATION forming part of Letters Patent No. 399,965, dated March 19, 1889.

Application filed July 18, 1888. Serial No. 280,348. (No model.)

*To all whom it may concern:*

Be it known that I, JAMES BRADLEY, a citizen of Canada and a subject of the Queen of Great Britain, residing at Dundee, in the county of Yates and State of New York, have invented certain new and useful Improvements in Strap, Trace, and Lace Trimmers and Cutters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to strap, trace, and lace trimmers and cutters; and its objects are, first, to procure a uniform effect on the material to be manipulated; second, to secure adjustability and variability of the parts of the machine; third, to adapt the machine to cut any desired width and contour of material; fourth, to adapt the machine to cut material of any width; fifth, to procure, automatically, the resumption of normal positions by the parts after use, and, sixth, to accomplish these ends with structural simplicity and economy. I attain these purposes by the mechanism illustrated in the accompanying drawings, in which—

Figure 1:
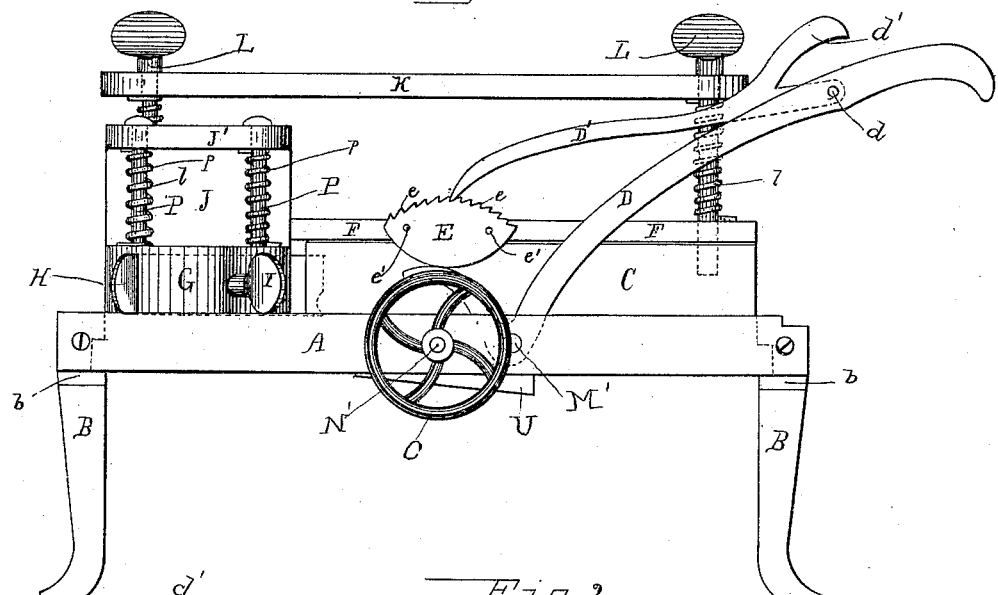
Figure 2:
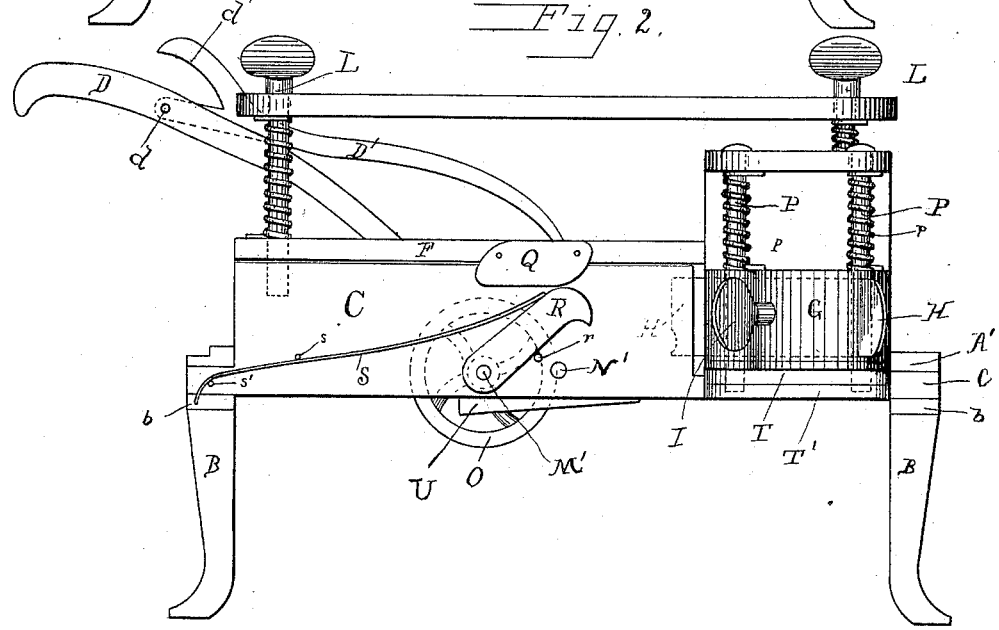

Figure 1 represents a side elevation of a cutting-machine embodying the essential features of my invention. Fig. 2 is a similar view taken from the opposite side of the machine. Fig. 3 is an end view of the machine. Fig. 4 is a plan view thereof. Fig. 5 indicates a detail view of the cutter. Fig. 6 represents a cam for synchronizing the reciprocations of the adjustable side rails. Fig. 7 represents the knife detached from its frame. Fig. 8 represents the set-screw by which the exposure of the knife out of its frame is regulated. Fig. 9 is a threaded spindle encircled in use by a spiral spring, by which the altitude of the cutter is varied. Fig. 10 indicates a similar spindle performing a like function for the adjustable side rails between which the material is held. Fig. 11 is a serrated segment, by which any given altitude can be maintained through the lever engaging therewith, which is shown in Fig. 12. Fig. 13 is an elongated spring serving to restore the side rails in position when said lever is released from the detents; and Fig. 14 shows the curved projection or lug secured to the side rails, against which the cam shown in Fig. 6 operates.

The same designations indicate corresponding parts in the several views.

In leather and saddlery business, as well as for analogous purposes, it is constantly necessary, to adapt a trace to its office, to trim an edge in a desired contour, and to cut a strip to the required size without regard to its pristine integrity, its thickness, or the unequal contour of the blank. It is also frequently important to cut a series of pieces to a uniform size and shape without alteration of the machine, or liability to disjoinder of the parts, so that one setting of the machine in the required correlation of parts will suffice to cut any number of pieces to a common size and shape. To effect these purposes with a simple structure not susceptible (when normally used) to a displacement or dislocation of the parts is therefore the aim of my invention. The frames A A', mounted on the legs B on suitable cross-frames $b$, support the shafts M N, the latter of which has threads $n$ to engage the interiorly-threaded sliding frame C, and the former of which is square and constitutes the fulcrum of the lever D, whose lower curved end actuates the segment E, thus raising the adjustable rails F, between which and the surface of the frame C the leather blank is held by means of the serrated segment E on one side rail and its counterpart segment Q on the other one, operated similarly by the cam R, attached terminally to the same shaft, whose end M' accommodates the operating-wheel O, and operating against the resiliency of the spring S, which passes over and under the pins $s\ s'$, secured in the frame A. Secured to the lever D is the bifurcated lever D', whose end $d^2$ is pivotally held in a slot in lever D by the pin $d^3$, and whose end $d'$ serves manually to release the other end of the lever D' from the segment E, having teeth $e$, which is held on the frame F by the pins $e'$. Two counterpart cutter-blocks, G, are secured to the opposite sides of the frames C by the threaded spindles P, whose heads depend from brackets J' J', and whose bases are secured into bars T T' and are encircled by spiral springs $p$ to permit the vertical adjustability of the blocks, which are slotted at right angles to each other to permit the respective insertion of the knife H and the regulating set-screw I. The adjustable side rails, F, reciprocate vertically on the threaded spindles L, whose ends $l'$ are secured into the frame C, and which are encircled by the spiral springs $l$, whose elasticity tends to normally restore the cross-frame K after its relative position has been altered by a manipulation of the lever D.

U is a bearing-block on which the lever D oscillates.

It will be understood that by turning the hand-wheel O the frames C C will approach to or recede from each other according to the direction of revolution, one of said frames sliding in grooves formed by the joinder of the bases A' b. Thus any size of blank may be subjected to the operation of cutter-blocks G, whose contained knives can be variably adjusted or supplanted by reason of set-screw I. By depressing the lever D the side rails, F, will be raised by the hooked end of the lever and the segment E on one side and by the cam R and segment Q on the other side. The leather is then inserted between them and the position thus obtained is maintained by the lever D', acting in the teeth $e$. The leather is then pulled through the machine and is reduced by intermediate contact with the knives H.

$r$ is a stationary pin inserted in the frame C, to serve as a limiting-stop for the cam R.

Having thus fully described my improvements, what I claim is—

In a leather-cutting machine, the adjustable side rails, F, guided by spindles L, joined by cross-bar K, and encircled by spiral springs $l$, in combination with the actuating-shaft M, having cam R, the operating-lever D, the segments E Q, the former of which has teeth $e$ to engage lever D', whose bifurcated ends $d'$ $d^2$ serve, respectively, for manual operation and for pivotal connections to the lever D, and block G, having perforations at right angles to each other to accommodate the knife H and set-screw I.

In testimony whereof I affix my signature in presence of two witnesses.

JAMES BRADLEY.

Witnesses:
 CLARENCE M. CLARK,
 EDWARD COOK.